United States Patent
Porath et al.

(10) Patent No.: US 9,863,550 B2
(45) Date of Patent: Jan. 9, 2018

(54) VALVE CONTROL DEVICE AND PROCESSING VALVE

(71) Applicant: GEA Tuchenhagen GmbH, Büchen (DE)

(72) Inventors: Bernd Porath, Breitenfelde (DE);
Martin Gesikiewicz, Lübeck (DE);
Heiko Stender, Lübeck (DE)

(73) Assignee: GEA Tuchenhagen GmbH, Büchen (DE)

( * ) Notice: Subject to any disclaimer, the term of this patent is extended or adjusted under 35 U.S.C. 154(b) by 8 days.

(21) Appl. No.: 15/034,781

(22) PCT Filed: Oct. 29, 2014

(86) PCT No.: PCT/EP2014/002897
§ 371 (c)(1),
(2) Date: May 5, 2016

(87) PCT Pub. No.: WO2015/067354
PCT Pub. Date: May 14, 2015

(65) Prior Publication Data
US 2016/0273675 A1 Sep. 22, 2016

(30) Foreign Application Priority Data
Nov. 5, 2013 (DE) .................. 10 2013 018 564

(51) Int. Cl.
*F16K 1/12* (2006.01)
*F16K 37/00* (2006.01)

(52) U.S. Cl.
CPC ............ *F16K 37/0025* (2013.01); *F16K 1/12* (2013.01); *Y10T 137/8242* (2015.04)

(58) Field of Classification Search
CPC .. F16K 1/12; F16K 37/0025; Y10T 137/8225; Y10T 137/8242
(Continued)

(56) References Cited

U.S. PATENT DOCUMENTS 4,821,769 A * 4/1989 Mills et al. ......... F16K 37/0041
137/554
6,522,128 B1 2/2003 Ely et al.
(Continued)

FOREIGN PATENT DOCUMENTS

DE      698 10 504 T2   11/2003
DE  10 2007 058 253 A1   6/2009
(Continued)

*Primary Examiner* — Kevin Lee
(74) *Attorney, Agent, or Firm* — Young Basile Hanlon & MacFarlane, P.C.

(57) ABSTRACT

A valve control device for a processing valve includes control electronics for controlling a drive and a measuring system for determining the position of an element movable within the valve control device along a straight direction of movement. The measuring system includes a transmission arrangement for transmitting an excitation wave, a resonator secured to the movable element and in which a resonant electric vibration is generated by the excitation wave, a receiving arrangement in which a signal is generated by a resonant wave generated by the resonant electric vibration, and measuring electronics connected to the transmission arrangement and the receiving arrangement. The measuring electronics generate the excitation wave in the transmission arrangement and determine the position of the movable element relative to the receiving arrangement from the signal of the receiving arrangement. A processing valve improved by the valve control device is also described.

20 Claims, 4 Drawing Sheets

(58) Field of Classification Search
USPC .................................................. 137/553, 554
See application file for complete search history.

(56) References Cited

U.S. PATENT DOCUMENTS

| | | | | |
|---|---|---|---|---|
| 8,714,515 | B2* | 5/2014 | Nannan et al. ........... | F15B 9/03 137/553 |
| 2006/0272712 | A1* | 12/2006 | Sontag ................ | F16K 31/0655 137/554 |
| 2008/0257428 | A1* | 10/2008 | Scholz et al. ......... | F16K 31/126 137/554 |
| 2015/0167861 | A1* | 6/2015 | Ferrer Herrera et al. .................. | F16K 37/0041 239/73 |
| 2015/0377383 | A1* | 12/2015 | Feinauer et al. .......... | F16K 1/36 137/554 |

FOREIGN PATENT DOCUMENTS

| | | |
|---|---|---|
| DE | 20 2014 102 940 U1 | 8/2014 |
| JP | H11283178 A | 10/1999 |
| WO | 95/17624 A1 | 6/1995 |
| WO | 95/31696 A1 | 11/1995 |
| WO | 02/093058 A1 | 11/2002 |

* cited by examiner

VALVE CONTROL DEVICE AND PROCESSING VALVE

TECHNICAL FIELD

The invention relates to a valve control device for a processing valve and a processing valve.

BACKGROUND

Processing valves within processing systems in the food, beverage and pharmaceutical industry as well as the fine chemical industry and biotechnology are incorporated in complex system controls. For this purpose, a valve control device is arranged on the processing valve and connected to the system controls. The valve control device reports the position of the processing valve to the system control and, in response to signals, changes the valve position once this is required by the process.

In earlier solutions, the position of the processing valve was determined by means of mechanical contacts. Microswitches and a component of the valve connected to a closing element touched each other. The component was designed to change the switching position of the microswitch by moving the component. The position of the closing element was determinable in this manner. Since this way of determining position was subject to wear, contact-free measuring methods were developed and successfully marketed.

Contact-free measuring methods are per se practically wear-free and possess the advantage of being able to perform a calibration when there is mechanical wear to valve parts, in particular the seal between the valve disk and valve seat. By means of this calibration, the closing position is also determined when, from the aging of the seal, it is reached in a changed position of the valve disc and valve seat relative to each other. Such a calibration method is described for example in WO 95/17624 A1 without further explanation of the contact-free measuring principle.

WO 02/093058 A1 presents both a calibration method as well as a device for the contact-free measurement of the valve position. A plurality of Hall sensors are used for measuring position that are arranged along the direction of movement of a permanent magnet connected to a valve rod moving one of the valve discs.

DE 10 2007 058 253 A1 explains another arrangement for contact-free measurement in a processing valve. A permanent magnet is affixed to the valve rod and interacts with a magnetorestrictive sensor.

SUMMARY

The contact-free measuring principles known in the prior art, in particular based on Hall sensors, have been used successfully within the market for years. The very high reliability this is absolutely essential for this necessitates a complex design, however, which gives rise to high costs for the valve controls.

It is therefore the object of the invention to present a valve control device for a processing valve that achieves high reliability with an economical design.

Described herein is a valve control device that is configured to interact with a processing valve and comprises control electronics for controlling a drive and a measuring system for determining the position of an element that is located within the valve control device and can be moved therein along a straight direction of movement.

The measuring system of the valve control device comprises a transmission arrangement for transmitting an electromagnetic excitation wave, a resonator, which is secured to the movable element and in which a resonant electric vibration is generated by the excitation wave, a receiving arrangement in which a signal is generated by an electromagnetic resonant wave generated by the resonant electric vibration, and measuring electronics that are connected to the transmission arrangement and the receiving arrangement and which are designed to generate the excitation wave in the transmission arrangement and determine the position of the movable element relative to the receiving arrangement from the signal of the receiving arrangement. This avoids components that must be expensively protected against vibrations and the effects of temperature, or that intrinsically possess high reliability but are becoming increasingly expensive such as permanent magnets. Instead, the components of the measuring system are both robust and economical so that high reliability is achieved economically. The use of a principle with an excitation wave and resonance wave furthermore provides a clean separation of useful signals from interspersed interfering signals. This increases the reliability of the measurement.

A first advantageous development provides designing and arranging the resonator such that the electromagnetic resonance wave is aligned rotationally symmetrical with a longitudinal axis, and the longitudinal axis is aligned with the direction of movement. This increases reliability because precise positional measurement is also feasible when the resonator rotates about its longitudinal axis.

In a subsequent development, the transmission arrangement and receiving arrangement are designed flat and aligned with the direction of movement covering a measurement path. This is accomplished with economical and technically simple production, for example as a printed multilayer circuit. This in turn advantageously affects reliability and cost.

In another development for enhancing the aforementioned advantages, a first electrical connection and a second electrical connection are provided between the control electronics and the measuring electronics. To reduce the complexity of the circuitry and achieve an interface between the circuit parts that is economical to produce, the first electrical connection is configured to supply the measuring electronics with an operating voltage, and the second electrical connection is configured to transmit a position signal. For example, a cable with only three wires is sufficient to create the first and second electrical connection.

The component costs are particularly low and the reliability is particularly high when, according to a subsequent development, the transmission arrangement comprises an electrical transmitter coil, and the receiving arrangement comprises an electrical receiver coil.

For its part, the aforementioned development can be developed such that the signal generated in the receiver coil by the resonance wave is an induction voltage, the size or magnitude of which depends on the position of the movable element. This is a measured variable that is particularly easy to handle; the complexity of the circuitry is therefore minimal, which increases reliability and the cost advantages.

A greater precision of measurement is achieved when the receiving arrangement comprises a first receiver coil and a second receiver coil.

In a development of this idea, the receiver coils are arranged so that the signals in the first and second receiver coil are phase-shifted relative to each other. The precision of measurement is furthermore increased.

The mechanical reliability is increased by arranging the transmission arrangement and receiving arrangement in a measuring system housing.

The design of the valve control device is simplified by mechanically connecting the control electronics to the measuring system housing.

In a development that further increases reliability due to shorter signal paths for the measuring signal between the receiving arrangement and required processing electronics, the measuring electronics are arranged in the measuring system housing.

A simple and robust resonator design results when, according to a development, the resonator comprises an electrical oscillating circuit.

According to another development, in a reliable resonator design that increases measuring reliability due to the rotational degrees of freedom, the resonator comprises an oscillating circuit with a resonance coil that is designed and arranged so that the electromagnetic resonance wave is aligned to be rotationally symmetrical with a longitudinal axis, and the longitudinal axis is aligned with the direction of movement.

The reliability is improved by enhanced robustness when, according to a development, the resonance coil is enclosed fluid-tight in an encapsulation, and the encapsulation possesses a central passage.

Advantageous gas conduction within the valve control arrangement is achieved when the passage, with a pressurizing medium channel for supplying a drive, is arranged to interact with a pressurizing medium.

The conducting of the pressurizing medium and robustness are improved when, according to a development, the movable element is arranged in a cup-shaped housing that opens toward a coupling flange of the valve control device. The coupling flange can be connected to the drive.

A space-saving design of the components of the valve control device is achieved when the control electronics are mechanically connected to a floor of the cup-shaped housing.

According to another development of the valve control device, the control electronics are operatively connected to at least one control valve. A simple drive control can thereby be achieved.

Particularly favorable conduction of the pressurizing medium is achieved when, according to an additional development, the control valve is connected to an outlet through which pressurizing medium can be admitted into the cup-shaped housing.

The valve control device for a processing valve can be developed in that the control electronics comprise an illuminant, which interacts with a transparent housing section of the valve control device as a visual display means. In this manner, the control electronics, in a simplification of the design, for their part act as a bearing component for the illuminant, which allows the display of the valve position independent of other auxiliary means.

In a development, the control electronics comprise storage means for storing valve parameters. In this manner, data ascertained during operation can be saved in the valve control device. The data is available for identifying changes as well as taking them into account or reporting them if necessary. Such changes can arise from impurities, wear, or otherwise generated deviations from the normal operation of the processing valve and can have an influence on the valve position.

To control the processing valve with a processing system control, a communication circuit is needed in the valve control device. To keep down the number of assemblies within the valve control device, it is advantageous for the control electronics to comprise a communication circuit.

The invention also offers a processing valve, in particular for the food industry or pharmaceutical industry as well as biotechnology. Due to the reliable measurement of the valve position, the interaction with a valve control device as described herein yields a processing valve that operates reliably under processing conditions such as high temperatures and wear-promoting media.

An arrangement of the components of the processing valve relative to each other that is positive in terms of production costs and reliability exists according to a development when the drive is arranged between the processing valve and valve control device. A drive rod is provided that passes through the drive and is connected to the shutoff device and the movable element.

According to a development of the processing valve, the drive rod comprises a pressurizing medium channel that starts at a rod end facing the movable element and ends within the drive. This generates a compact design in which a critical part is arranged within the valve components and thereby increases safety.

The invention will be further explained, and details of the effects and advantages will be described with reference to an exemplary embodiment and its developments.

DETAILED DESCRIPTION

Figure 1:
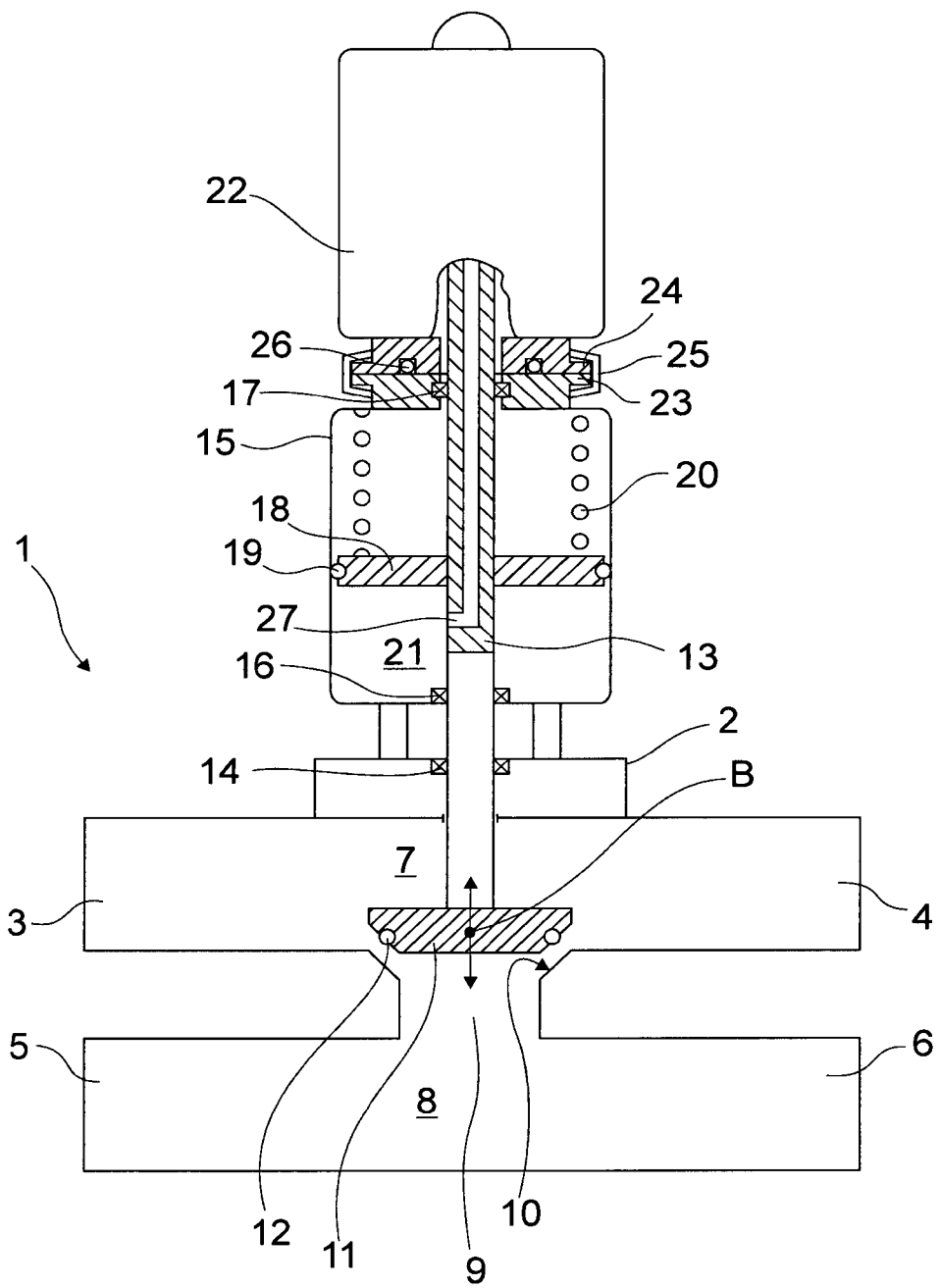
FIG. 1 shows a schematic representation of a processing valve with a valve control device.

FIG. 1 shows a schematic, partially cut-away representation of a processing valve 1 that is suitable for the food, beverage, fine chemical and pharmaceutical industries, as well as for biotechnology. The processing valve 1 has a valve housing 2, which for example has a first, second, third and fourth connection 3, 4, 5 and 6. The first and second connection 3 and 4 establish a fluid connection to a first chamber 7 of the processing valve 1; the third and fourth connection 5 and 6 correspondingly establish a fluid connection to a second chamber 8. Each of the connections 3, 4, 5 and 6 is connectable to a pipeline of a processing system. Within the valve housing 2, a passage 9 is provided between the first chamber 7 and second chamber 8 that is surrounded by a valve seat 10. A shutoff device 11 is arranged so that it can be brought into sealing contact with the valve seat 10 in order to interrupt the connection from the first chamber 7 to the second chamber 8 formed by the passage 9 and to thereby establish a closed position of the processing valve 1.

Furthermore, the shutoff device 11 is arranged such that the contact can be disengaged in order to release the connection from the first chamber 7 to the second chamber 8. Depending on the required sealing effect, a shutoff seal 12 can be provided on the shutoff device 11 that interacts with the valve seat 10 to provide a seal in the closed position.

A one-part or multipart drive rod 13 is for example connected to the shutoff device 11. A bushing 14 seals the passage at which the drive rod 13 passes through the valve housing 2. The drive rod 13 passes through a drive 15 and is sealed at its entry point and exit point by means of a bottom and top drive seal 16 and 17.

Within the drive 15, a piston 18 is connected to the drive rod 13. By means of a piston seal 19, the piston 18 is sealed from the housing of the drive 15. A spring 20 instigates the movement of the piston 18 along the direction of movement B in a first direction. A pressurizing medium in a pressure chamber 21 counteracts the force of the spring 20 and instigates the movement of the piston 18 along the direction of movement B opposite the first direction. Upon the movement of the piston 18, there is a movement of the drive rod 13 and hence the shutoff device 11 as well. The contact between the valve seat 10 and shutoff device 11 can be correspondingly established or disengaged. If the contact is disengaged, the open position of the valve 1 is reached in which a fluid connection exists between the first chamber 7 and the second chamber 8.

On the side of the drive 15 facing away from the valve housing 2, a valve control device 22 is arranged and releasably connected to the drive 15. In order to create this connection, the drive 15 has a drive flange 23. For its part, the valve control device 22 has a coupling flange 24 that is connected to the drive flange 23 by means of a clamp 25, or another suitable connecting means. The flange connection is designed pressurizing medium-tight. For this purpose, a flange seal 26 is provided on the coupling flange 24. Alternatively, the flange seal 26 is arranged on the drive flange 23, or on the drive flange 23 and coupling flange 24, in a more or less engaging manner.

As an example and advantageously, the drive rod 13 possesses a pressurizing medium channel 27 with a main section that for example is designed in the form of a borehole along its axis. This pressurizing medium channel 27 connects the valve control device 22 to the pressure chamber 21 so that pressurizing medium passes from the valve control device 22 into the drive 15 and brings about its change in position. This avoids external pressurizing medium ducts that constitute a source of errors, for example from the breakage of brittle lines.

Figure 2:
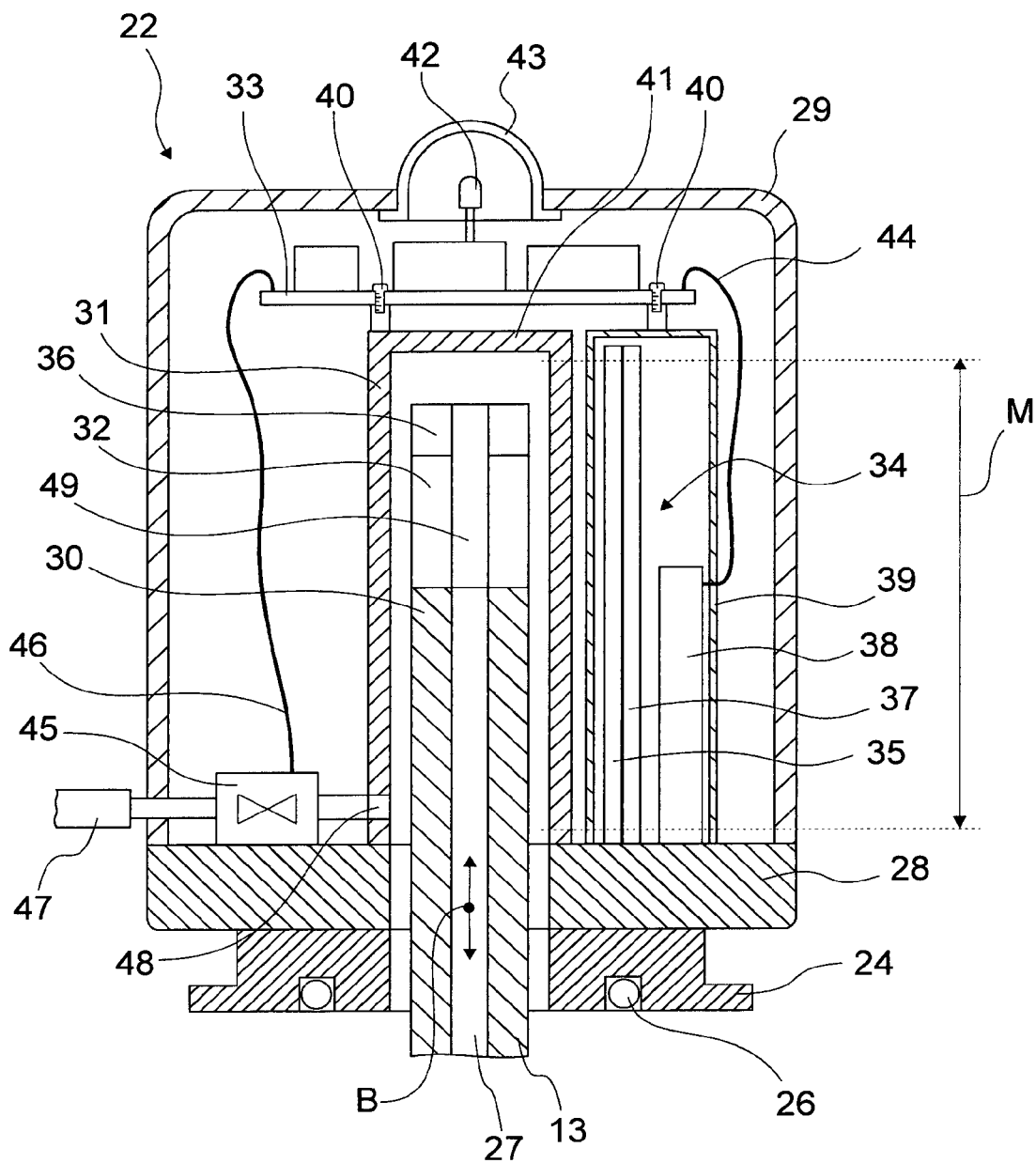
FIG. 2 shows a cross-sectional view of the control device according to FIG. 1.

FIG. 2 shows a section of the valve control device 22 with schematically depicted electronic components. The valve control device 22 possesses a base 28 to which is fastened the coupling flange 24 by means of which the valve control device 22 can be connected in a sealed manner to the drive 15 with the assistance of the flange seal 26. A cover 29 is releasably connected to the base 28 and covers the functional components of the valve control device 22 such as the electronic components.

The rod end 30 of the drive rod 13 passes through the center of the coupling flange 24 and extends into the interior of a cup-shaped housing 31. The cup-shaped housing 31 is fastened to the base 28 and is preferably sealed there. A movable element 32 is fastened to the rod end 30 and is stationary relative to the rod end 30 and movable relative to the cup-shaped housing 31. The movable element 32 can be designed as a single part with the drive rod 13; however, separation is advantageous for production since the movable element 32 can be thereby combined with the different drive rods 13 of different valve types.

In its interior, the valve control device 22 possesses control electronics 33 by means of which the drive 15 is controlled to determine and change the valve position. It also possesses a measuring system 34 for determining the valve position.

The measuring system 34 comprises a transmission arrangement 35 by means of which an electromagnetic excitation wave is transmitted that can be continuous, modulated or pulsed. This excitation wave generates a resonant vibration in a resonator 36 that is provided on the movable element 32. This resonant vibration for its part generates an electromagnetic resonance wave R, which is transmitted by the resonator 36 and received by means of a receiving arrangement 37.

The drive 15 instigates a movement of the movable element 32 along the straight movement path B. The design of the drive 15 and processing valve 1 establishes the stroke of the processing valve, whereby a necessary measuring path M is also established along which the resonator 36 can move. The transmission arrangement 35 and receiving arrangement 37 are configured so that the position of the resonator 36 can be determined relative to the measuring path M.

Measuring electronics 38 are designed so that they generate the required electrical signal by means of which the transmission arrangement 35 is operated. The measuring electronics 38 are also designed so that they can process the currents and voltages generated by the electromagnetic resonance wave R in the receiving arrangement 37 into a position signal, and are designed to generate a signal that is a measure of the position of the resonator 36 relative to the receiving arrangement 37.

The measuring system 34 with the transmission arrangement 35, receiving arrangement 37 and measuring electronics 38 comprises a measuring system housing 39 by means of which a module is advantageously created that significantly simplifies the positioning of the measuring system 34 within the valve control device 22 and its installation.

A particularly compact design is achieved since the control electronics 33 are fastened to the floor 41 of the cup-shaped housing 31 and to the measuring system housing 39 with screws 40 or other fastening or locking means. This layout also makes it possible to arrange an illuminant 42 on the control electronics 33 that interacts with a transparent housing section 43. This is for example designed in the shape of a dome such that the signal light emitted by the illuminant 42 is visible within a large solid angle.

The control electronics 33 and measuring electronics 38 are electrically connected by means of a measuring connection 44. The measuring connection 44 serves in particular to transmit the signal representing the position of the movable element 32 relative to the receiving arrangement 37.

A control valve 45 is arranged within the valve control device 22. The opened or closed switching state of this control valve 45 is set by the control electronics 33 by means of a switching connection 46.

On the one hand, the control valve 45 is connected to a pressurizing medium supply 47 and on the other hand to an outlet 48 in the cup-shaped housing 31. When the control valve 45 is open, pressurizing medium flows out of the pressurizing medium supply through the control valve 45 and the outlet 48 into the cup-shaped housing 31. A passage 49 passes through the movable element 32 and resonator 36 and establishes a fluid connection between the interior of the cup-shaped housing 31 and the pressurizing medium channel 27. When the control valve 45 is in open position, pressurizing medium flows into the pressurizing medium channel 27 that terminates in the pressure chamber 21 of the drive 15. The pressurizing medium causes a shift of the piston 18 against the force of the spring 20 and, overall, a movement of the shutoff device 11 away from the valve seat 10 such that the processing valve 1 moves into the open position in which a fluid connection exists between the first chamber 7 and the second chamber 8.

Figure 3:
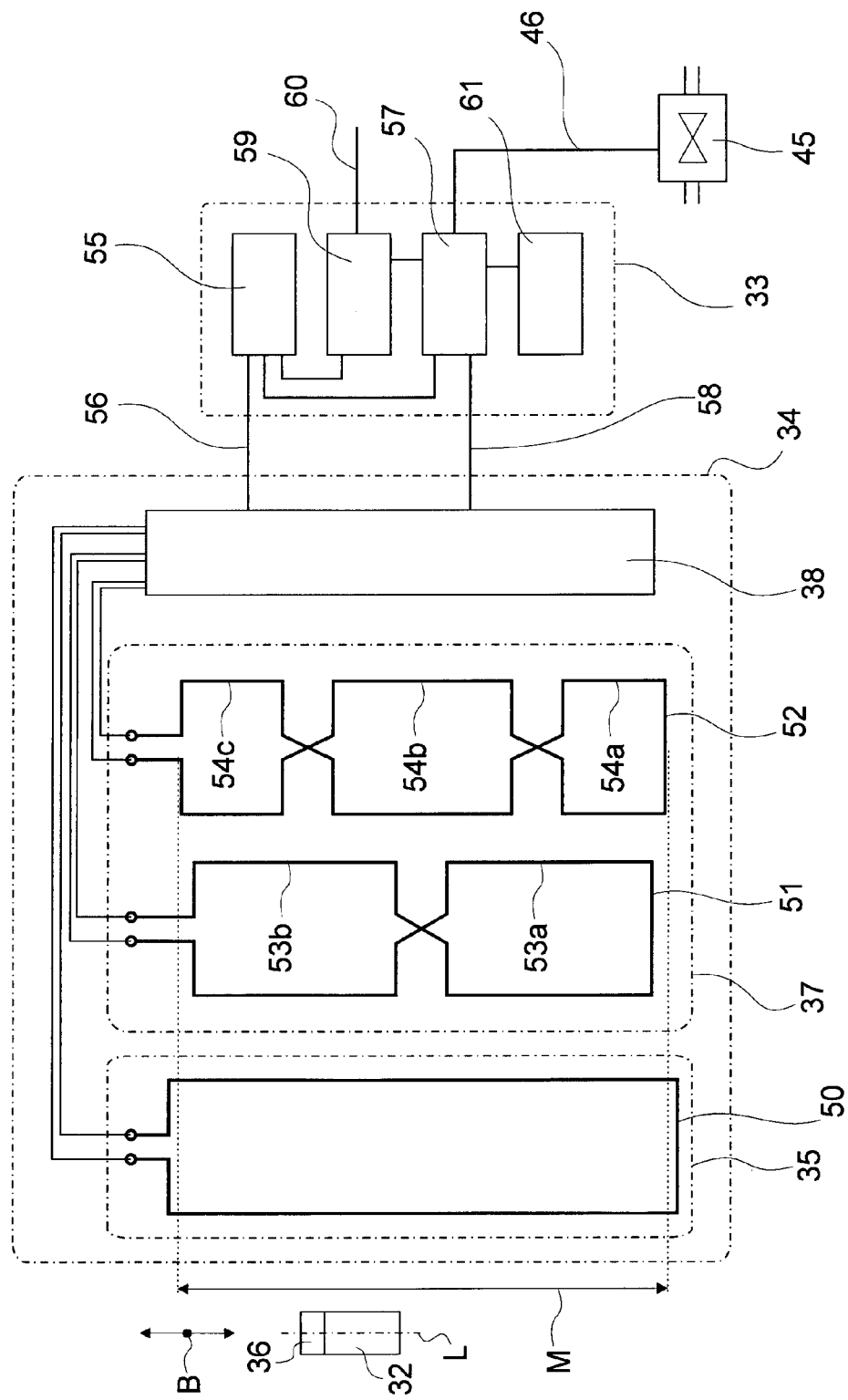
FIG. 3 shows a schematic representation of the measuring system, the movable element, and the electronic components of the valve control device according to FIGS. 1 and 2.

The functional layout of the transmission arrangement 35, receiving arrangement 37 and control electronics 33 will be further explained with reference to the schematic depiction in FIG. 3.

The transmission arrangement 35 comprises a flat transmitter coil 50 that extends along the length of the measuring path M. The transmitter coil 50 can comprise one or more conductor loops that can be advantageously designed as conductor tracks on a printed circuit board.

The receiving arrangement 37 comprises a first receiver coil 51 and a second receiver coil 52. Both receiver coils 51 and 52 are flat and advantageously designed as conductor tracks on a printed circuit board. The first receiver coil 51 and second receiver coil 52 are dimensioned such that the receiving arrangement 37 extends along measuring path M.

The coils 50, 51 and 52 can be part of a common multilayer printed circuit. This enables highly economical production and simultaneously yields a vibration-resistant orientation of the coils 50, 51 and 52 relative to each other. This increases the reliability of the measuring system 34. The arrangement is particularly compact when the coils 50, 51 and 52 lie over each other, such as in a layered construction according to DE 69 810 504 T2.

The first receiver coil 51 and second receiver coil 52 are electronically phase shifted relative to each other. This is the case in FIG. 3 and is illustrated by conductor loops. The first receiver coil 51 comprises two conductor loops 53a and 53b, which both have an equivalent extension in direction of movement B and are sequential along the direction of movement B. The second receiver coil 52 possesses three conductor loops along the direction of movement B. A middle conductor loop 54b possesses a greater extension than the two outer conductor loops 54a and 54c, wherein the extensions of these two conductor loops 54a and 54c are equivalent. The design of the first receiver coil 51 and second receiver coil 52 causes the induction generated by the resonance wave R in the conductor loops 53a and 53b, or respectively 54a, 54b and 54c to be different in size for a given position of the resonator 36. This allows the position of the resonator 36 to be derived while measuring the induction strength, for example by calculating a ratio of the induction strengths.

The number of conductor loops 53a, 53b, 54a, 54b and 54c and the shape and number of windings depend on the available signal strength of the resonance wave R and the desired local resolution, and correspondingly vary from the depicted example. Other design aspects of the coils 50, 51 and 52 can be found in DE 69 502 283 T2.

The receiver coils 51 and 52 are connected to the measuring electronics 38 so that the voltages induced therein are available to electronic circuits of the measuring electronics 38 for further processing, such as the aforementioned ratio calculation. A circuit of the measuring electronics 38 is connected to the transmitter coil 50 in order to supply current thereto.

The control electronics 33 comprise a supply circuit 55. This generates the voltages and currents required to operate the components of the control electronics 33 and measuring electronics 38. The measuring electronics 38 are connected to the supply circuit by means of a first electrical connection 56.

A control circuit 57 of the control electronics 33 is connected to the measuring electronics by a second electrical connection 58. By means of this connection, a signal is transmitted that represents the position of the resonator 36 and hence the shutoff device 11. This can be a digital value or an analog voltage.

A communication circuit 59 is provided in the control electronics 33. This communication circuit 59 serves to exchange control commands and position signals by means of a communication link 60 with an external device such as a processing system control. This exchange comprises the feedback of the valve position to the processing system control and the command to open or close the processing valve 1. Such a command is converted by the control circuit 57 into a required current supplied to the control valve 45 by means of which the control circuit 57 is connected via the switching connection 46.

A storage medium 61 is provided in the control electronics 33 and is connected to the control circuit 57 so that location values can be entered therein such as position values of the shutoff device 11 for the open position and closed position of the processing valve 1. This storage medium 61 can be used for the methods according to WO 2002/093058 A1.

Together, the first and second electrical connections 56 and 58 advantageously form the measuring connection 44 and are designed as a three-wire or four-wire cable. This brings about a particularly simple arrangement consisting of the control electronics 33 and measuring system 34, which can be installed particularly free of errors.

Figure 4:
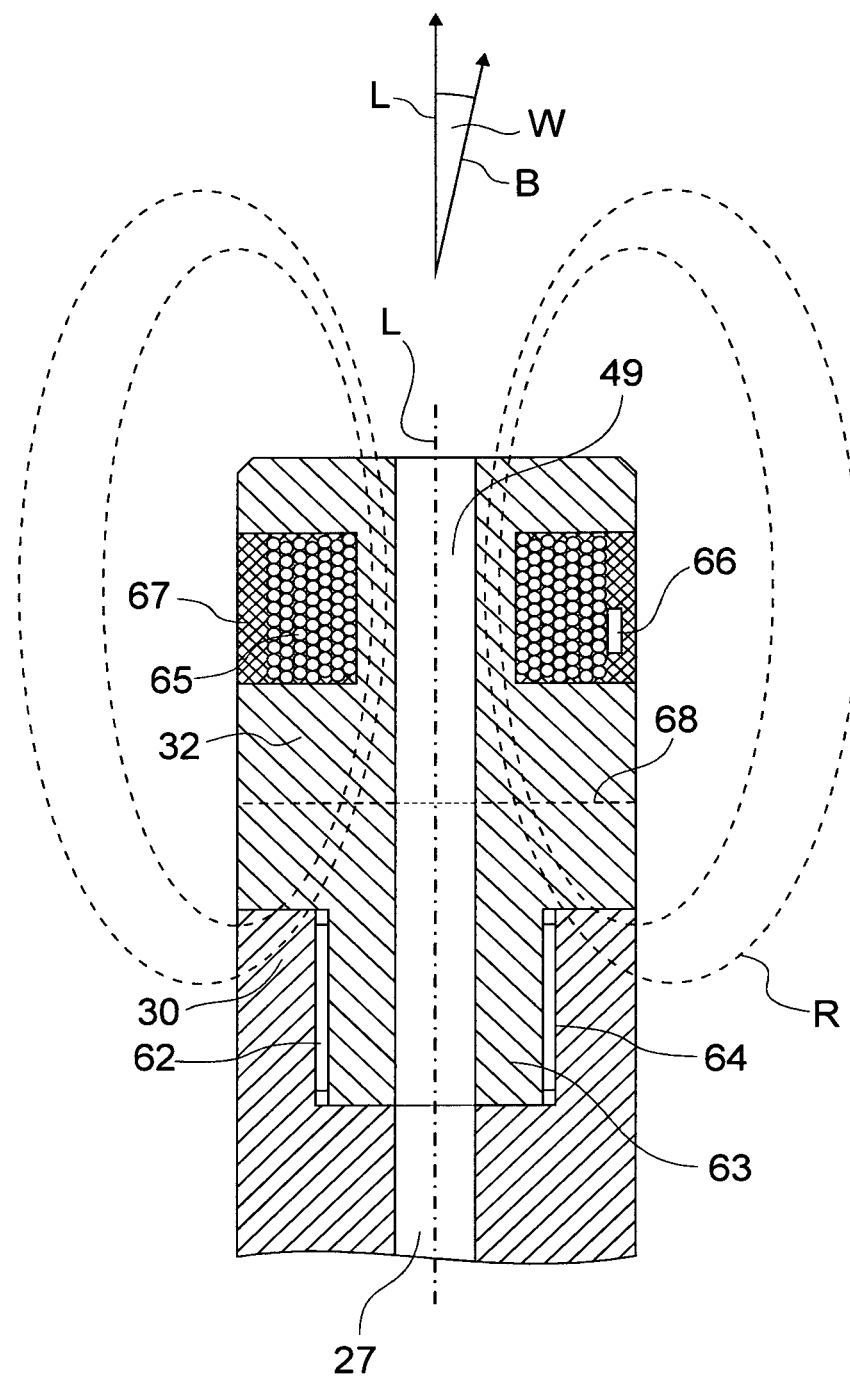
FIG. 4 shows a cross-sectional view of a resonator arranged on the movable element with a representation of the magnetic field component of the resonance wave.

A section of an embodiment of the resonator 36 is shown in FIG. 4. The movable element 32 is fastened to the rod end 30 of the drive rod 13, or to a part connected thereto. According to this example, the rod end 30 and movable element 32 are shaped so that they form a screw connection 62. In this regard, a cylindrical extension 63 with an outer thread is accommodated in a recess 64 provided with an inner thread. According to the example, the cylindrical extension or projection 63 is arranged on the movable element 32, whereas the recess 64 is provided in the rod end 30. A mirrored arrangement is also possible in which the recess 64 is arranged in the movable element 32, and the cylindrical projection 63 is arranged in the rod end 30. The screw connection is particularly easy to install in comparison to other friction-lock, form-fit or integral connections of the rod end 30 and movable element 32. In addition to the screw connection, an additional connection 68 can be created by means of which two parts of the movable element 32 are connected to each other. This is preferably designed to be difficult to separate and can be based on a friction lock or form fit. "Difficult to separate" in this context means that it can be removed, but on the other hand does not separate while the processing valve 1 is operating. Such an additional connection 68 makes it possible to create a movable element 32 with few components that can be adapted to many different valve types.

The resonator 36 is designed as an electrical oscillating circuit and comprises an electrical coil 65. The windings of the electrical coil 65 are wound around a longitudinal axis L of the movable element 32. In particular, the electrical coil 65 is wound so that the resonance wave R results, which is rotationally symmetrical to the longitudinal axis L. Rotating the movable element 32 about its longitudinal axis L therefore does not yield a measurable change in the signal within the receiving arrangement 37. This increases the reliability of the measurement and hence of the entire processing valve 1 since a rotation arising during the operation of the processing valve 1 is not reflected in the measurement. Such a rotation can for example be introduced from forces acting on the shutoff device 11 by the conveyed fluid, or by torque from the spring 20 on the piston 18 introduced into the movable element 32. To illustrate the symmetry of the resonance wave R, the magnetic field component is schematically indicated as a dashed line in FIG. 4.

In addition to the electrical coil 65, the oscillating circuit comprises a capacitor 66. Preferably, the electrical coil 65 and capacitor 66 are protected by an encapsulation to protect, for example, from corrosive components contained in the pressurizing medium. This can be advantageously designed economically and mechanically stable as potting 67.

The movable element 32 has a central passage 49, which also centrally penetrates the electrical coil 65 and encapsulation. The passage 49 is fluidically connected to the pressurizing medium channel 27 that terminates in the cylindrical extension 63 of the rod end 30 and interacts with the pressurizing medium channel 27 to supply the drive 15 with a pressurizing medium.

The direction of movement B of the movable element 32 is established by the structure of the valve 1 and valve control device 22. According to the structure, it can, for example, stand perpendicular on the plane passing through the valve seat 10 and/or the coupling flange 24. The longitudinal axis L of the movable element 32, and hence the axis of symmetry of the resonance wave R, are structurally designed to coincide with the direction of movement B, or at least be parallel thereto. The actual movement can be tilted relative to the structurally established, as it were planned, direction of movement B from component tolerances or wear. This corresponds to an angle W that arises between the longitudinal axis L and the direction of movement B.

This typically equals values of two angular degrees or less. The transmission arrangement 35, receiving arrangement 37 and measuring electronics 38 are designed such that the position of the movable element 32 is also determined when there is a deviation by the angle W.

Alternatively to the embodiment of the processing valve 1 disclosed here, this can have a different number of connections 3, 4, 5 and 6. In addition to the shutoff seal 12, the processing valve 1 can contain other seals and be designed as a double seat valve, and therefore have other shutoff means in addition to the shutoff device 11. A person skilled in the art is familiar with other types of embodiments, such as the embodiment as a tank bottom valve.

A list of the reference numbers in the drawings is described below.

1 Processing valve
2 Valve housing
3 First connection
4 Second connection
5 Third connection
6 Fourth connection
7 First chamber
8 Second chamber
9 Passage
10 Valve seat
11 Shutoff device
12 Shutoff seal
13 Drive rod
14 Bushing
15 Drive
16 Bottom drive seal
17 Top drive seal
18 Piston
19 Piston seal
20 Spring
21 Pressure chamber
22 Valve control device
23 Drive flange
24 Coupling flange
25 Clamp
26 Flange seal
27 Pressurizing medium channel
28 Base
29 Cover
30 Rod end
31 Cup-shaped housing
32 Movable element
33 Control electronics
34 Measuring system
35 Transmission arrangement
36 Resonator
37 Receiving arrangement
38 Measurement electronics
39 Measuring system housing
40 Locking means
41 Floor
42 Illuminant
43 Transparent housing section
44 Measuring connection
45 Control valve
46 Switching connection
47 Pressurizing medium supply
48 Outlet
49 Passage
50 Transmitting coil
51 First receiving coil
52 Second receiving coil
53a Conductor loop
53b Conductor loop
54a Conductor loop
54b Conductor loop
54c Conductor loop
55 Supply circuit
56 First electrical connection
57 Control circuit
58 Second electrical connection
59 Communication circuit
60 Communication link
61 Storage means
62 Screw connection
63 Cylindrical extension
64 Recess
65 Resonance coil
66 Capacitor
67 Encapsulation
68 Additional connection
L Longitudinal axis
B Direction of movement
R Resonance wave
W Intermediate angle
M Measuring path

The invention claimed is:

1. A valve control device for a processing valve, comprising:
a measuring system for determining a position of a movable element that is located within the valve control device and is movable in said valve control device along a straight direction of movement, the measuring system comprising:

a transmission arrangement for transmitting an electromagnetic excitation wave, a resonator, which is secured to the movable element and in which a resonant electric vibration is generated by the electromagnetic excitation wave, a receiving arrangement in which a signal is generated by an electromagnetic resonant wave generated by the resonant electric vibration, and measuring electronics, which are connected to the transmission arrangement and the receiving arrangement and which generate the electromagnetic excitation wave in the transmission arrangement and determine a position of the movable element relative to the receiving arrangement from the signal of the receiving arrangement.

2. The valve control device according to claim 1, wherein the resonator is arranged so that the electromagnetic resonant wave is aligned to be rotationally symmetrical with a longitudinal axis that is aligned with the straight direction of movement.

3. The valve control device according to claim 1, wherein the transmission arrangement and receiving arrangement are flat and aligned with the straight direction of movement covering a measurement path.

4. The valve control device according to claim 1, further comprising:

control electronics for controlling a drive of the movable element; and a first electrical connection and a second electrical connection provided between the control electronics and the measuring electronics, wherein the first electrical connection is configured to supply the measuring electronics with an operating voltage, and the second electrical connection is configured to transmit a position signal.

5. The valve control device according to claim 1, wherein the transmission arrangement comprises an electrical transmitter coil, and the receiving arrangement comprises an electrical receiver coil.

6. The valve control device according to claim 5, wherein the signal generated in the electrical receiver coil by the electromagnetic resonant wave is an induction voltage, a magnitude of which depends on the position of the movable element.

7. The valve control device according to claim 5, wherein the electrical receiver coil comprises a first receiver coil and a second receiver coil.

8. The valve control device according to claim 7, wherein the first receiver coil and the second receiver coil are arranged so that signals in the first receiver coil and the second receiver coil are phase-shifted relative to each other.

9. The valve control device according to claim 1, wherein the resonator comprises an electrical oscillating circuit.

10. The valve control device according to claim 1, the resonator comprises an oscillating circuit with a resonance coil arranged so that the electromagnetic resonant wave is aligned to be rotationally symmetrical with a longitudinal axis that is aligned with the straight direction of movement.

11. The valve control device according to claim 10, wherein the resonance coil is enclosed fluid-tight in an encapsulation, and the encapsulation comprises a central passage.

12. The valve control device according to claim 11, wherein the central passage interacts with a pressurizing medium channel for supplying a drive for the movable element with a pressurizing medium.

13. The valve control device according to claim 12, further comprising:

a cup-shaped housing that opens toward a coupling flange of the valve control device, the coupling flange arranged for connection to the drive and the movable element arranged in the cup-shaped housing.

14. The valve control device according to claim 1, further comprising:

control electronics for controlling a drive of the movable element, wherein the control electronics are operatively connected to a control valve.

15. The valve control device according to claim 14, further comprising:

a cup-shaped housing that opens toward a coupling flange of the valve control device, the coupling flange arranged for connection to the drive and the movable element arranged in the cup-shaped housing, wherein the control valve is connected to an outlet through which a pressurizing medium can be admitted into the cup-shaped housing.

16. The valve control device according to claim 1, further comprising:

control electronics comprising an illuminant that interacts with a transparent housing section of the valve control device as a visual display.

17. The valve control device according to claim 1, further comprising:

control electronics for controlling a drive of the movable element, wherein the control electronics comprise a storage device for storing valve parameters and a communication circuit.

18. A processing valve, comprising:

a passage and a shutoff device by means of which a shut position and an open position of the processing valve are effectuated;

a drive for moving the shutoff device between the shut position and the open position; and the valve control device according to claim 1, wherein the shutoff device is indirectly or directly connected to the movable element of the valve control device.

19. The processing valve according to claim 18, wherein the drive comprises a drive rod passing through the drive and connected to the shutoff device and the movable element.

20. The processing valve according to claim 19, wherein the drive rod comprises a pressurizing medium channel that starts at a rod end facing the movable element and ends within the drive.

* * * * *